United States Patent [19]
Homeyer

[11] Patent Number: 5,664,721
[45] Date of Patent: Sep. 9, 1997

[54] BACKPACK-STYLE FIREARM/BOW/FISHING ROD CARRIER

[76] Inventor: Gregory M. Homeyer, 12180 Oak Tree La., Willis, Tex. 77378

[21] Appl. No.: 627,124

[22] Filed: Apr. 4, 1996

[51] Int. Cl.⁶ ............................................. A45F 3/14
[52] U.S. Cl. .................... 224/651; 224/250; 224/149; 224/913; 224/916; 224/922; D3/216; D3/221
[58] Field of Search ........................ 224/149, 150, 224/913, 916, 917, 600, 627, 637, 651, 250, 257, 258, 200, 922; D3/221, 216, 217

[56] References Cited

U.S. PATENT DOCUMENTS

| | | |
|---|---|---|
| D. 311,813 | 11/1990 | Oliver ............................ D3/216 |
| D. 352,603 | 11/1994 | Maller ............................ D3/221 |
| 995,458 | 6/1911 | Harriman ....................... 224/913 |
| 2,224,568 | 12/1940 | Altorfer ......................... 224/917 |
| 2,576,559 | 11/1951 | Bennek ......................... 224/913 |
| 2,715,989 | 8/1955 | Sjodin et al. ................. 224/913 |
| 3,098,591 | 7/1963 | LeRude . | |
| 3,182,871 | 5/1965 | Gossler ......................... 224/913 |
| 3,258,182 | 6/1966 | McDonald . | |
| 3,334,794 | 8/1967 | Saari et al. . | |
| 3,973,776 | 8/1976 | Ogle . | |
| 4,518,107 | 5/1985 | Amos ............................ 224/259 |
| 4,754,904 | 7/1988 | Fischer et al. . | |
| 4,867,359 | 9/1989 | Donovan ...................... 224/257 |
| 5,400,937 | 3/1995 | Rottenberg ................... 224/917 |
| 5,417,354 | 5/1995 | Jones . | |
| 5,492,254 | 2/1996 | Challoner et al. ........... 224/257 |

FOREIGN PATENT DOCUMENTS

| | | | |
|---|---|---|---|
| 574631 | 12/1993 | European Pat. Off. | 224/211 |
| 612489 | 8/1994 | European Pat. Off. | 224/917 |
| 1566704 | 5/1980 | United Kingdom | 224/211 |
| 87/07170 | 12/1987 | WIPO | 224/917 |

*Primary Examiner*—Henry J. Recla
*Assistant Examiner*—Gregory M. Vidovich
*Attorney, Agent, or Firm*—Mary J. Gaskin

[57] ABSTRACT

A "backpack"-style carrier for transporting sporting equipment such as a rifle, a shotgun, an archery bow, or a fishing rod. The butt end of the rifle stock, the pulley end of a compound bow, or the handle grip of a fishing rod is disposed in the device's lower "pocket". The barrel, the upper bow limb, or the upper fishing rod portion is held in place by an upper strap which closes with a hook and loop fastening system. Shoulder straps attached to the device allow the sporting equipment to be carried "backpack"-style, in a vertical position. An optional waist belt provides additional stability.

5 Claims, 3 Drawing Sheets

BACKPACK-STYLE FIREARM/BOW/FISHING ROD CARRIER

FIELD OF THE INVENTION

The present invention relates to a "backpack" style carrier which is lightweight, strong, and easy to use. The carrier can be used for transporting one of several different types of sporting equipment, including a rifle, a shotgun, an archery bow, and one or two fishing rods. The invention is directed to a carrier which does not inhibit or hinder the function of a transported rifle or shotgun while the carrier is attached to it. Further, use of the carrier invention requires no modification of the transported equipment.

BACKGROUND OF THE INVENTION

Sportsmen, whether hunters or fishermen, travel to various locations for sport, using different means of conveyance, including walking, riding horseback, or sitting in an all-terrain vehicle (ATV). Hunters commonly set up a campsite at a location remote to the desired hunting area to avoid disturbing the game being pursued. Sometimes they travel to the desired hunting area over terrain which prevents access by means other than walking, riding horseback, or by ATV.

While traversing different and rugged terrains on foot, a sportsman carrying equipment is sometimes required to use both hand and arms for climbing, crawling, and moving obstacles out of his way. While carrying a rifle or archery bow on horseback or in an ATV, a sportsman needs to have quick access to his weapon; on the other hand, the weapon must be secured to prevent damage during transportation. Once he arrives at the hunting area, the hunter may need to climb into and out of tree stands or elevated box blinds, or use a "climbing tree stand."

Means of carrying or transporting a sportsman's weapon or fishing rod have been described in several U.S. Patents, including U.S. Pat. No. 3,098,591, Lerude, Jul. 23, 1963; U.S. Pat. No. 3,258,182, McDonald, Jun. 28, 1966; U.S. Pat. No. 3,334,794, Saari, Aug. 8, 1967; U.S. Pat. No. 3,973,776, Ogle, Aug. 10, 1976; U.S. Pat. No. 5,417,354, Jones, May 23, 1995. However, the types of equipment currently available for sportsmen to use in conveying weapons and fishing rods have various drawbacks. Some allow limited access to the weapon while being carried. Some prevent a sportsman from using both hands and arms for climbing rugged terrain. Some subject the weapons to jolts and vibrations which can damage the sighting systems. Some fail to prevent the possibility that the weapon will fall off the hunter's body, the horse, or the ATV and accidentally discharge. Some prevent or inhibit the use of the weapon while it is attached to the carrier. Some are cumbersome, heavy and uncomfortable to use. Finally, some attach to the weapon, which usually requires drilling or machining the carried equipment.

SUMMARY OF THE INVENTION

The present invention is designed to accept most types of rifles, archery bows, and fishing rods. It has a unitary construction and can be used with or without an optional waist belt. The carrying assembly is constructed of a strip of fabric web strap material, with a "pocket" formed at the lower end and a "circle" of strap material (closed with Velcro strips or another fastening system) at the upper end. Also attached to the upper end are two strips of strap material, each of which can be positioned over the sportsman's shoulder as a shoulder strap. At the end of each strip is a set of "D-rings". Two straps are also attached to the lower end of the carrying assembly; these are pulled from the back to the front of the torso, where they are threaded though the D-rings on the shoulder straps. A belt loop is also attached to the lower end of the carrying assembly. A removable belt with a quick release buckle is provided for insertion through the belt loop.

The butt end of the rifle stock, the pulley end of a compound bow, or the handle grip of a fishing rod and reel fits into the lower "pocket", and the barrel, upper bow limb, or upper fishing rod portion is held in place by the upper circle of material, which has been closed by mating the Velcro strips. The carrier is then held, "backpack"-style, by pulling the shoulder straps over the sportsman's shoulders. The shoulder straps are adjustable for the wearer's comfort and the security of the carried equipment. The straps may also be adjusted so that the carried equipment can be positioned high enough on the wearer's back to allow him to be seated on an ATV or on horseback without having the equipment touch the vehicle seat or frame or the horse's back or saddle, thereby reducing or eliminating the effect of vehicle vibrations and jolts on the equipment. The optional belt strap acts to secure the equipment more tightly to the wearer's body when he is traveling over rough terrain.

It is the main object of this invention to provide a sporting equipment carrier which is safe, comfortable, and convenient for equipment such as rifles, shotguns, archery bows and arrows, and fishing rods and reels.

It is another object of this invention to provide a sporting equipment carrier which permits the user to safely carry the equipment while climbing over rough terrain or in and out of tree stands, etc.

It is yet another object of the invention to provide a carrier which secures the equipment whether the wearer is leaning, bending, or stooping, thereby preventing its being dropped and damaged.

Another object of the invention is to provide a carrier which allows a wearer to safely, conveniently and comfortably carry sporting equipment while riding on an ATV or on horseback.

Yet another object of this invention is to provide a sporting equipment carrier which is lightweight and flexible, so that the rifle or shotgun may be used while the carrier is still engaged on it.

Still another object of the invention is to provide a sporting equipment carrier which does not require a user to drill, machine or otherwise modify the carried equipment.

DESCRIPTION OF THE PREFERRED EMBODIMENT

Figure 1:
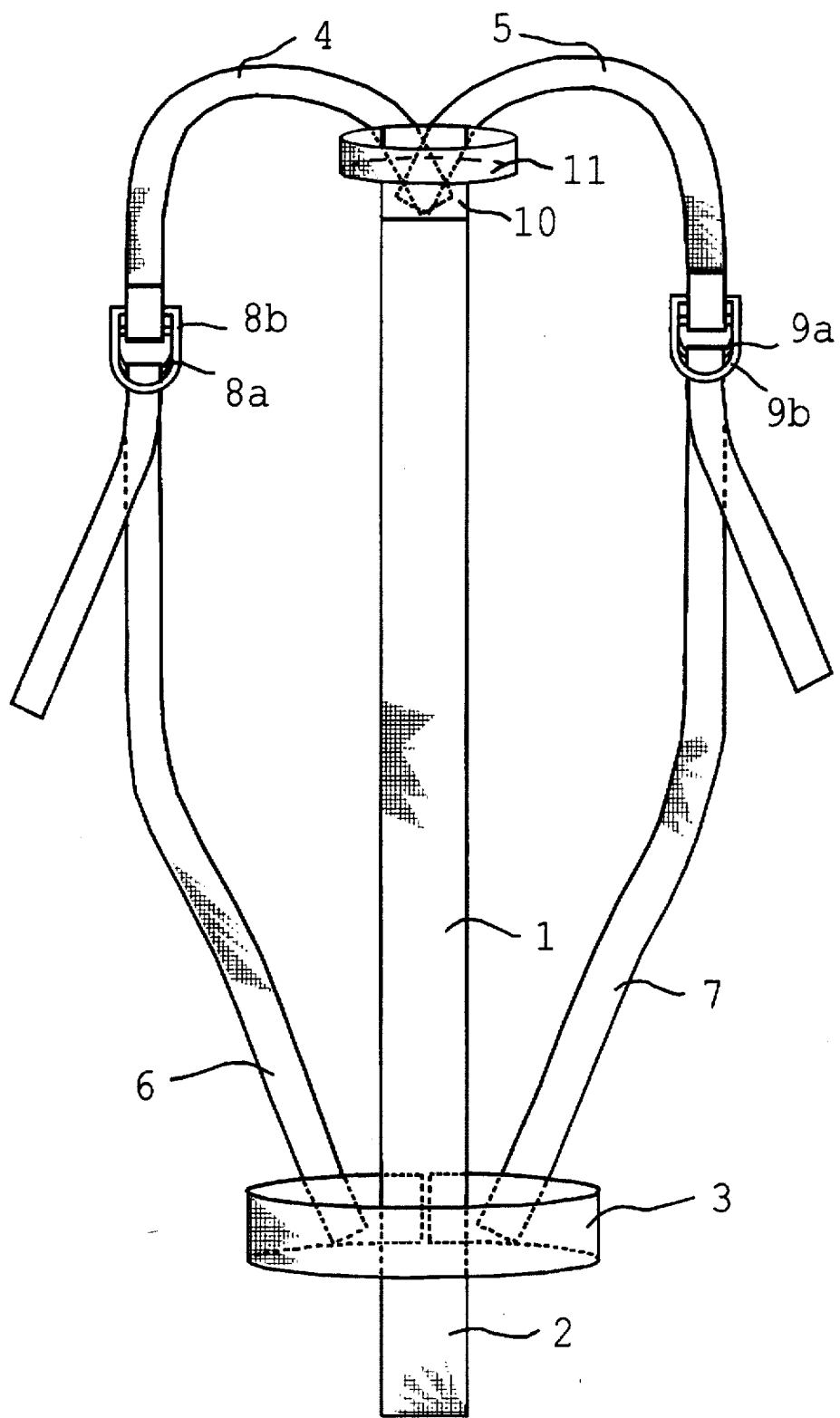
FIG. 1 is a front perspective "see-through" view of the carrier made in accordance with the present invention.
Figure 2:
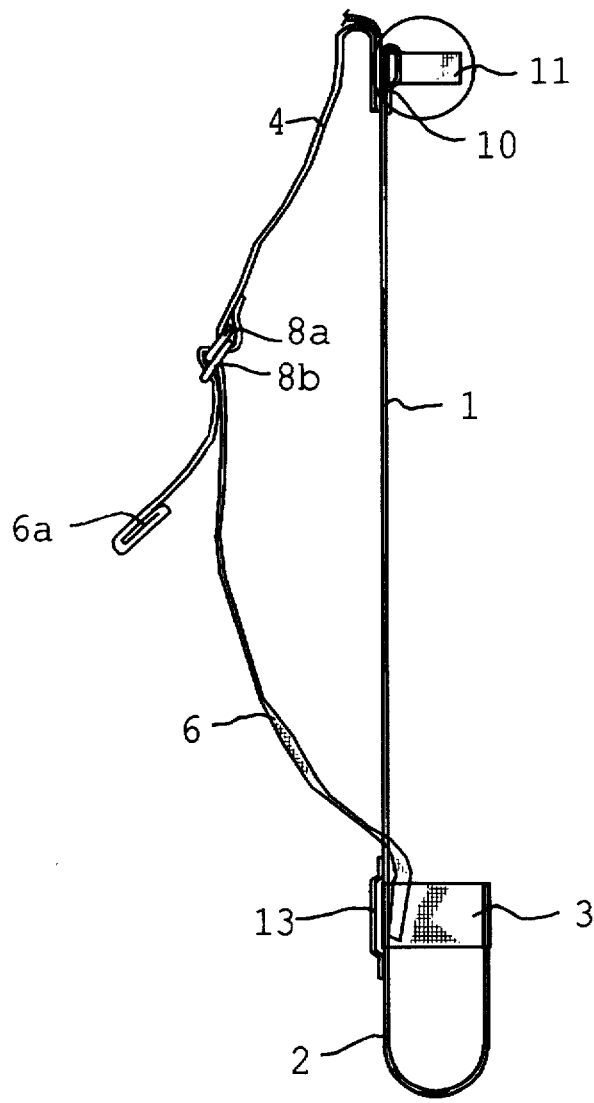
FIG. 2 is a side view of the carrier.

The carrying assembly shown in FIGS. 1 and 2 comprises the main carrier piece 1, which is a vertically-disposed first length of heavy-duty, flexible material, with a lower tag end turned upward to approximate a "J"-shaped pocket 2. The heavy-duty, flexible material can be fabric web strap material, heavy cotton cloth, such as denim, or leather. The ends of a second length of the same material have been overlapped and attached to form a circular holder 3, which is perpendicularly disposed to the main carrier piece 1. (This and the other attachments can be accomplished by sewing with heavy-duty cotton or nylon thread, or by using metal rivets or any other permanent means of assembling fabric and leather objects.) The circular holder 3 is disposed over the "J"-shaped pocket 2, and the upturned end of the "J"-shaped pocket is attached to the inside of circular holder 3 at the front. The main carrier piece 1 is also attached to the inside of circular holder 3 on the rear portion. In this way, the "J"-shaped pocket 2 and the circular holder 3 form a holding area approximately 4 to 5 inches deep. The upper tag end of the main carrier piece 1 has been folded back onto itself and attached, creating an open loop 10. A third short length of the same material forms a circular gripper strip 11, which has been passed through the open loop 10 and the ends releasably attached to each other to close the circle. The ends of two additional lengths of the same material are overlapped and attached, at opposite angles, to the upper portion of the main carrier piece 1, thus forming the upper shoulder straps 4 and 5. The opposite end of each upper shoulder strap 4 and 5 has been inserted through a set of two "D-rings" 8a, 8b and 9a, 9b, then folded back onto itself and attached. The "D-rings" are typically made of heavy-duty plastic or metal. The ends of two additional lengths of the same flexible material are attached to the back of circular holder 3, one on each side of the main carrier piece 1, at opposite angles, to form the lower shoulder straps 6 and 7. Alternatively, these ends could be attached to the lower portion of the main carrier piece 1. The opposite end of each lower shoulder strap 6, 7 has been threaded through the "D-rings" 8a, 8b, or 9a, 9b.

FIG. 2, a side view, shows some of the details of the carrier assembly more clearly. It shows the main carrier piece 1, with the "J"-shaped pocket 2 and the circular holder 3. The gripper strip 11 has been threaded through the open loop 10. The end of the upper shoulder strap 4 holds "D-rings" 8a and 8b. The lower shoulder strap 6 has been threaded through both "D-rings" 8a and 8b, then has been passed over the outer portion of "D-ring" 8a, then back through the inside portion of "D-ring" 8b. That end of the lower shoulder strap 6 has been folded back onto itself twice to create a triple thickness, then sewn, to make a "stop" 6a, which prevents separation of the upper shoulder strap 4 and the lower shoulder strap 6, when at maximum length adjustment. A short length of the same material is placed parallel to the back of the main carrier piece 1 and is attached to it, both above and below the circular holder 3, thereby forming a belt loop 13.

Figure 3:
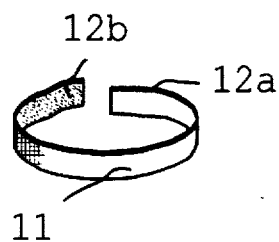
FIG. 3 is an enlarged detail view of part 11, in an "open" configuration.
Figure 4:
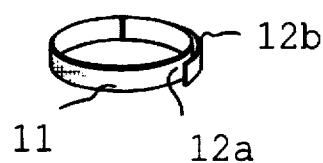
FIG. 4 is an enlarged detail view of part 11, in a "closed" configuration.

FIGS. 3 and 4 are enlarged views of the gripper strip 11. Each part of a two-part, releaseable fastening system 12a, 12b has been attached to the opposite side of each end of the open gripper strip 11. The fastening system is preferably a hook and loop fastening system such as Velcro, but another system, such as heavy-duty snaps or D-rings, may be used. FIG. 4 shows the gripper strip 11 after the parts of the two-part, releaseable fastening system 12a, 12b have been overlapped and "closed" to form a circular configuration.

Figure 5:
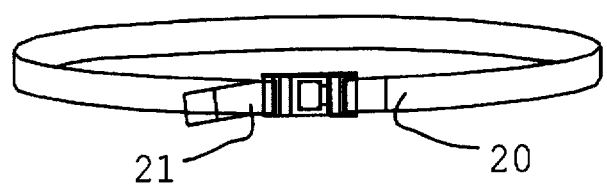
FIG. 5 is a front perspective view of the belt (20), which can be used with the carrier.

FIG. 5 shows a removable belt 20, which is constructed of the same material. The belt shown has a belt buckle 21 which is made of a plastic polymer, is slide-adjustable and has a "quick" release feature. The belt 20 is designed to be passed through the belt loop 13 shown in FIG. 2; it is used to provide further security and stability to the carrier assembly.

Figure 6:
FIG. 6 illustrates a front view of a man carrying a rifle in accordance with the present invention.

FIG. 6 shows a front view of a man using the carrier assembly to carry a rifle 30. The visible parts are the upper shoulder straps 4, 5 and lower shoulder straps 6, 7, the belt 20, and belt buckle 21.

Figure 7:
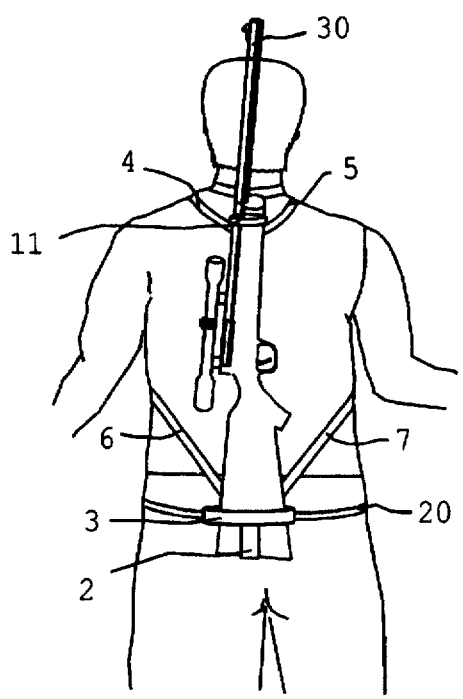
FIG. 7 illustrates a back view of a man carrying a rifle with a telescopic sight in accordance with the present invention.

FIG. 7 shows the back view of a man using the carrying assembly to carry a rifle 30. The lower end of the rifle 30 is contained in the "J"-shaped pocket 2, and stabilized by the circular holder 3. The upper end of the rifle 30 is gripped by the closed gripper strip 11. FIG. 7 shows the upper shoulder straps 4, 5 and the lower shoulder straps 6, 7.

Figure 8:
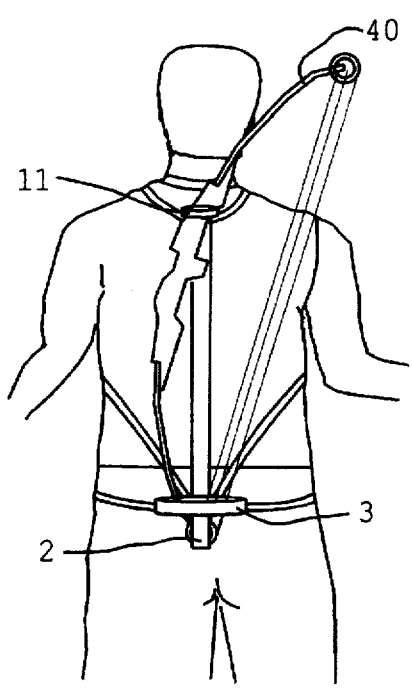
FIG. 8 illustrates a back view of a man carrying a compound archery bow in accordance with the present invention.

FIG. 8 shows the lower end of a compound bow 40 inserted into the "J"-shaped pocket 2 and stabilized by the circular holder 3. The gripper strip 11 has been closed around an upper portion of the bow 40.

Figure 9:
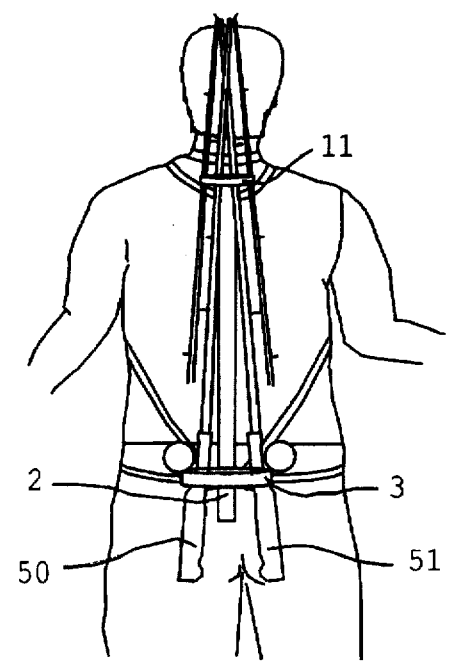
FIG. 9 illustrates a back view of a man carrying two, two-piece fishing poles in accordance with the present invention.

FIG. 9 shows the lower ends of two, two-piece fishing poles 50, 51 inserted into the "J"-shaped pocket, and stabilized by circular holder 3. Gripper strip 11 has been closed around the upper portions of the two, two-piece poles 50, 51.

Disclosed heretofore is the best embodiment of the invention presently contemplated. However, it is to be understood that various changes and modifications may be made thereto without departing from the spirit of the invention.

What is claimed is:

1. An assembly for carrying a firearm, a bow, or one or two fishing rods, said assembly comprising:

(1) a flexible main strap with an upper end folded over and attached to itself to form an upper loop, and with a lower portion turned upward to approximate a J-shape terminating in a tag lower end;

(2) a circular strap perpendicularly disposed to said main strap and attached to said main strap near the lower end and also attached at a second point 180° removed to said tag lower end of said main strap;

(3) a flexible enclosing strap, an end of said enclosing strap having been inserted through said upper loop, and both ends of said enclosing strap then fastened to each other with releasable fastening means;

(4) a pair of upper shoulder straps, an end of each of said upper shoulder straps having been attached to a back flat side of said upper end of said main strap, and another end of each of said upper shoulder straps having a coupling means attached thereto;

(5) a pair of lower shoulder straps, an end of each of said lower shoulder straps having been attached in a spaced apart relationship to a back flat side of said circular strap, and another end of each of said lower shoulder straps having been respectively inserted into said coupling means on each said end of each of said upper shoulder straps.

2. An assembly as set forth in claim 1, wherein each of said straps is made from material selected from a group consisting of web strap material, heavy-duty cotton cloth, and leather.

3. An assembly as set in claim 1, wherein said releasable fastening means is a hook and loop fastening system.

4. An assembly as set forth in claim 1, further comprising (6) a belt loop attached to a back flat side of said lower end of said main strap, said belt loop disposed even with said circular strap;

(7) an adjustable waist strap, with an end of said waist strap having been inserted through said belt loop, and both ends of said waist strap then fastened to each other with buckling means.

5. An assembly as set forth in claim 1, wherein said coupling means also functions as strap-length adjusting means for adjusting the length of said lower shoulder straps with respect to said upper shoulder straps.

* * * * *